United States Patent [19]
Schermerhorn

[11] Patent Number: 5,951,730
[45] Date of Patent: Sep. 14, 1999

[54] FURNACE FOR PRODUCING FUSED SILICA GLASS

[75] Inventor: Paul M. Schermerhorn, Painted Post, N.Y.

[73] Assignee: Corning Incorporated, Corning, N.Y.

[21] Appl. No.: 09/071,403

[22] Filed: May 1, 1998

Related U.S. Application Data

[62] Division of application No. 08/712,297, Sep. 11, 1996, abandoned
[60] Provisional application No. 60/003,595, Sep. 12, 1995.

[51] Int. Cl.$^6$ .......................... C03B 19/01; C03B 19/09
[52] U.S. Cl. .......................... 65/17.3; 65/17.4; 65/144; 65/413; 65/416; 65/414; 65/DIG. 8; 501/54; 501/900; 264/1.21; 264/119; 264/121; 264/125
[58] Field of Search .................. 65/17.3, 17.4, 65/144, 413, 416, 414, DIG. 8; 501/54, 900; 425/73, 425; 264/1.21, 119, 121, 125

[56] References Cited

U.S. PATENT DOCUMENTS

| | | |
|---|---|---|
| 3,806,570 | 4/1974 | Flamenbaum et al. . |
| 3,859,073 | 1/1975 | Schultz . |
| 3,930,819 | 1/1976 | Martin . |
| 3,966,446 | 6/1976 | Miller . |
| 4,065,280 | 12/1977 | Kao et al. . |
| 4,071,288 | 4/1977 | French et al. . |
| 4,135,901 | 1/1979 | Fujiwara et al. . |

(List continued on next page.)

FOREIGN PATENT DOCUMENTS

| | | |
|---|---|---|
| 4-12032 | 1/1992 | Japan . |
| 5-97452 | 4/1993 | Japan . |
| 5-116969 | 5/1993 | Japan . |
| 6-166527 | 6/1994 | Japan . |
| 6-234530 | 8/1994 | Japan . |
| 6-234531 | 8/1994 | Japan . |
| 6-308717 | 11/1994 | Japan . |
| WO 93/00307 | 1/1993 | WIPO . |

OTHER PUBLICATIONS

"Corning Tests for Striae in Fused Silica," *Laser Focus World*, p. 110, Aug. 1993.
Hetherington et al., "Water in Vitreous Silica," *Phys. Chem. Glasses*, 1962, 3:129–133.
Pfau et al., *Applied Optics*, vol. 31, No. 31, pp. 6658–6661 (Nov. 1, 1992).

(List continued on next page.)

*Primary Examiner*—Peter Chin
*Assistant Examiner*—Michael P. Colaianni
*Attorney, Agent, or Firm*—Maurice M. Klee; Angela N. Nwaneri

[57] ABSTRACT

Fused silica boules (19) having improved off-axis homogeneity are produced by controlling the air flow around the boule (19) during its formation. The boule is formed in a containment vessel (13) which collects soot from a plurality of burners (14). The containment vessel (13) rotates and oscillates relative to the burners (14) as the boule (19) is formed. Surrounding the containment vessel (13) is an air flow wall (130) which oscillates with the containment vessel (13). The air flow wall (130) is spaced from the containment vessel (13) by a gap (175) through which air flows during boule formation. The dimensions of this gap (175) remain constant as the boule is formed. Surrounding the air flow wall (130) is a stationary wall (160). The stationary wall (160) is spaced from the air flow wall (130) by a gap (165) whose dimensions change as the boule is formed. A motion accommodating seal (155) blocks air flow in this gap (165). By confining air flow to the gap (175) between the containment vessel (13) and the air flow wall (130), off-axis striae in the boule are essentially completely eliminated.

9 Claims, 7 Drawing Sheets

U.S. PATENT DOCUMENTS

| | | |
|---|---|---|
| 4,203,744 | 5/1980 | Schultz et al. . |
| 4,231,774 | 11/1980 | Maklad . |
| 4,263,031 | 4/1981 | Schultz . |
| 4,265,649 | 5/1981 | Achener . |
| 4,363,647 | 12/1982 | Bachman et al. . |
| 4,568,370 | 2/1986 | Powers . |
| 4,612,023 | 9/1986 | Kreutzer et al. ............... 65/DIG. 8 |
| 4,713,104 | 12/1987 | Brown et al. ...................... 65/144 |
| 4,740,226 | 4/1988 | Toda ................................. 65/414 |
| 4,935,046 | 6/1990 | Uchikawa et al. ................ 65/17.3 |
| 4,978,379 | 12/1990 | Sawada et al. . |
| 5,015,279 | 5/1991 | Guibert et al. ................... 65/144 |
| 5,043,002 | 8/1991 | Dobbins et al. . |
| 5,049,175 | 9/1991 | Röss et al. . |
| 5,086,352 | 2/1992 | Yamagata et al. . |
| 5,152,819 | 10/1992 | Blackwell et al. . |
| 5,211,732 | 5/1993 | Abbott et al. . |
| 5,221,309 | 6/1993 | Kyoto et al. . |
| 5,364,430 | 11/1994 | Sarkar . |
| 5,364,433 | 11/1994 | Nishimura et al. . |
| 5,395,413 | 3/1995 | Sempolinski et al. ............ 65/414 |
| 5,401,290 | 3/1995 | Akaike . |
| 5,410,428 | 4/1995 | Yamagata et al. . |
| 5,523,266 | 6/1996 | Nishimura et al. . |
| 5,556,442 | 9/1996 | Kanamori et al. . |
| 5,696,038 | 12/1997 | Maxon ............................. 65/414 |
| 5,698,484 | 12/1997 | Maxon ............................. 65/413 |
| 5,762,672 | 6/1998 | Ikeda et al. ...................... 65/144 |

OTHER PUBLICATIONS

Yamagata, S., "Effects of OH–Group on Distribution of Refractive Index in Silica Glass," *J. Cer. Soc. Japan*, 1992, 100:337–341.

Translation of Japanese Patent Publication No. 4–12032 (JP 1992), Item #31 above.

Translation of Japanese Patent Publication No. 5–97452 (JP 1993), Item #32 above.

Translation of Japanese Patent Publication No. 5–116969 (JP 1993), Item #33 above.

Translation of Japanese Patent Publication No. 6–166527 (JP 1994), Item #34 above.

Translation of Japanese Patent Publication No. 6–234530 (JP 1994), Item #35 above.

Translation of Japanese Patent Publication No. 6–234531 (JP 1994), Item #36 above.

Translation of Japanese Patent Publication No. 6–308717 (JP 1994), Item#37 above.

PV        0.036 WAVES
RMS       0.006 WAVES
δn        9.69 × 10⁻⁸
THICKNESS 9.17" (23.29cm)
APERTURE  13.09mm
λ         632.8nm

PV         0.024 WAVES
RMS        0.003 WAVES
δn         9.08 x $10^{-8}$
THICKNESS  6.7" (17cm)
APERTURE   13.78mm
λ          632.8nm

FURNACE FOR PRODUCING FUSED SILICA GLASS

CROSS REFERENCE TO RELATED APPLICATIONS

This is a divisional of U.S. application Ser. No. 08/712,297, filed on Sep. 11, 1996 now abandoned, which claims the benefit under 35 USC §119(e) of U.S. Provisional Application No. 60/003,595, filed Sep. 12, 1995, the contents of both of which in their entireties are hereby incorporated by reference.

FIELD OF THE INVENTION

This invention relates to the production of fused silica glass and, in particular, to methods and apparatus for improving the homogeneity of such glass, i.e., for reducing variations in the index of refraction of the glass.

DESCRIPTION OF THE TECHNOLOGY

Figure 1:
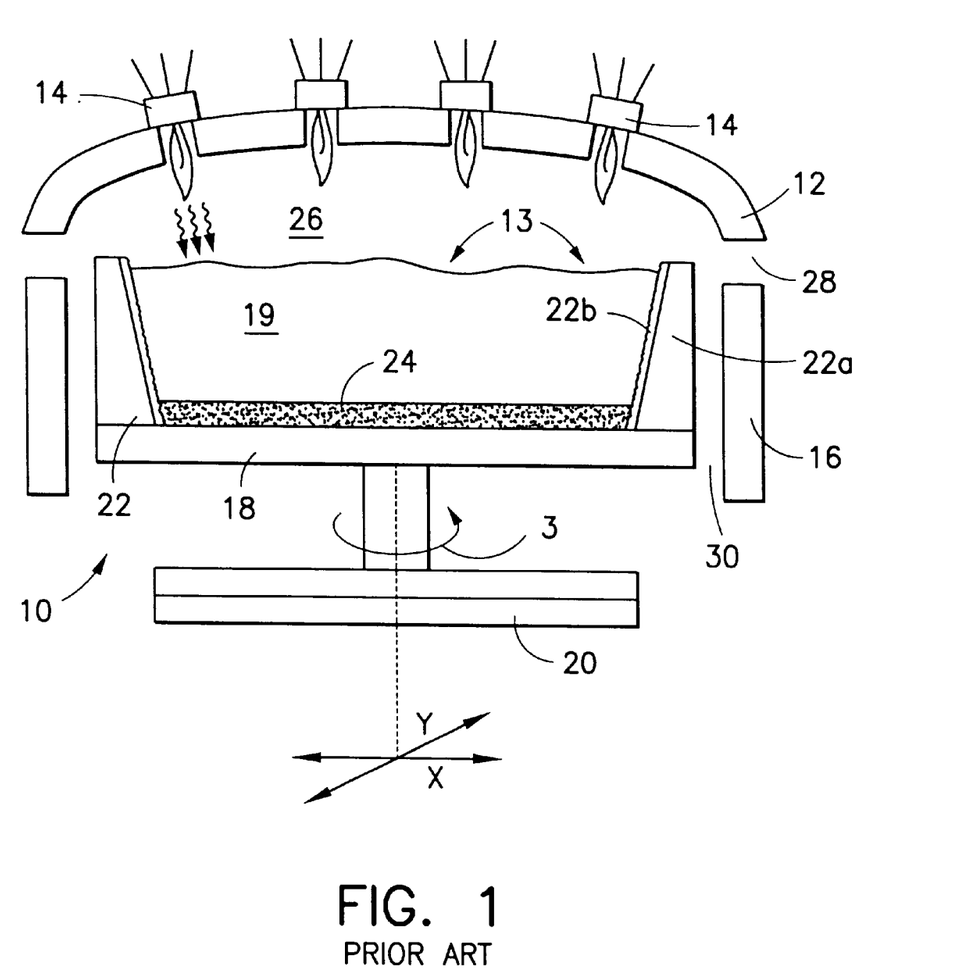
FIG. 1 is a schematic diagram of a prior art furnace used to produce fused silica boules using a flame hydrolysis process.

FIG. 1 shows a prior art furnace 10 for producing fused silica glass. In overview, silicon-containing gas molecules are reacted in a flame to form $SiO_2$ soot particles. These particles are deposited on the hot surface of a rotating body where they consolidate into a very viscous fluid which is later cooled to the glassy (solid) state. In the art, glass making procedures of this type are known as vapor phase hydrolysis/oxidation processes or simply as flame hydrolysis processes. The body formed by the deposited particles is often referred to as a "boule" and this terminology is used herein, it being understood that the term includes any silica-containing body formed by a flame hydrolysis process.

Furnace 10 includes a crown 12 having multiple deposition burners 14, a ring wall 16 which supports the crown, and a rotatable base 18 mounted on a x-y oscillation table 20. The crown, ring wall, and base are each made of refractory materials. Preferred patterns for the motion of the x-y oscillation table 20, which can be used in the practice of the present invention, are described in commonly assigned U.S. patent application Ser. No. 60/003,596, entitled "Boule Oscillation Patterns for Producing Fused Silica Glass", which was filed on Sep. 12, 1995 in the name of John E. Maxon.

Refractory blocks 22 are mounted on base 18 to form containment vessel 13. The blocks form the vessel's containment wall and the portion of base 18 surrounded by the wall (the bottom of the vessel) is covered with high purity bait sand 24 which collects the initial soot particles. Refractory blocks 22 can be composed of an outer alumina base block 22a and an inner liner 22b made of, for example, zirconia or zircon. Other refractory materials and constructions can, of course, be used if desired. A preferred construction for containment vessel 13, which is suitable for use with the present invention, is described in commonly assigned U.S. patent application Ser. No. 60/003,608, entitled "Containment Vessel for Producing Fused Silica Glass," which was filed on Sep. 12, 1995 in the name of John E. Maxon.

The space 26 between the top of containment vessel 13 and crown 12, which is referred to herein as a "plenum", is vented by a plurality of vents 28 formed at the top of ring wall 16 at its junction with the crown. The vents are connected to a suitable exhaust system by ducting which creates a negative pressure in the plenum.

The negative pressure causes air to flow upward through annular gap 30 between the ring wall and the containment vessel. In accordance with the present invention, the oscillatory motion of table 20 and containment vessel 13 relative to wall 16 has been found to cause variations in the air flow through gap 30. Further, it has been found that these variations adversely effect homogeneity, in particular, they result in an inhomogeneity known in the art as "striae" (see discussion below). The present invention provides a furnace construction which essentially completely removes this inhomogeneity.

As practiced commercially, boules having diameters on the order of five feet (1.5 meters) and thicknesses on the order of 5–8 inches (13–20 cm) can be produced using furnaces of the type shown in FIG. 1. Multiple blanks are cut from such boules and used to make various products, including optical elements, such as, lenses (including lenses for microlithography systems), prisms, and the like. The blanks are generally cut in a direction parallel to the axis of rotation of the boule in furnace 10, and the optical axis of a lens element made from such a blank will also generally be parallel to the boule's axis of rotation. For ease of reference, this direction will be referred to herein as the "z-direction" or the "z-axis." Measurements of inhomogeneity made in a direction perpendicular to the z-axis will be referred to as "off-axis" measurements.

The amount of variation in the index of refraction of a blank which can be tolerated depends on the product which is to be made from the blank. Homogeneity of a blank or optical element is normally measured using interferometric techniques. When large parts are to be made, a large aperture interferometer is used, e.g., an interferometer having an aperture of 18 inches (46 cm).

Figure 2:
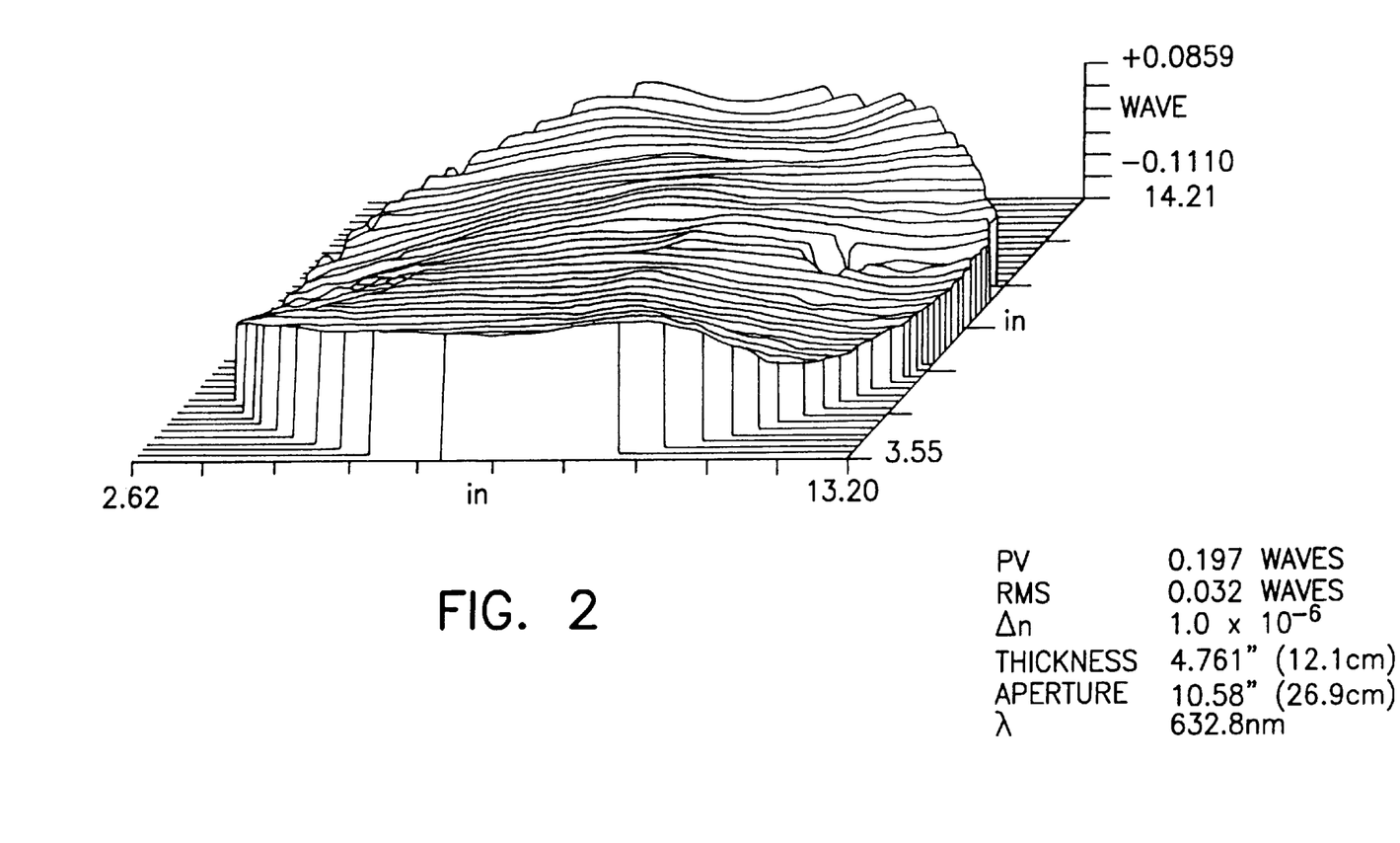
FIG. 2 shows a 10.58-inch (26.9 cm) interferometer phase plot for a section of a fused silica boule prepared in accordance with the present invention. The phase plot is taken along the z-axis of the boule. As shown, the PST, TLT, and PWR components have been removed from the original raw data (ZYGO terminology; Zygo Corporation, Middlefield, Conn.).

FIG. 2 shows a 10.58-inch (26.9 cm) interferometer plot (phase plot) for a fused silica boule prepared in accordance with the present invention. The boule was prepared using (1) a furnace of the type shown in FIG. 4, (2) a containment vessel whose inner walls were sloped at an angle of 10° with respect to vertical, and (3) the oscillation pattern referred to as "process 3" in the above-referenced application entitled "Boule Oscillation Patterns for Producing Fused Silica Glass."

Quantitatively, the z-direction homogeneity of a blank is expressed as its $\Delta n$ value, which is calculated from the interferometer plot using the equation:

$$\Delta n = (\lambda \cdot PV)/t_b, \tag{1}$$

where $\lambda$ is the wavelength of light used by the interferometer, PV is the difference between the highest peak and the lowest valley of the phase plot, and $t_b$ is the thickness of the blank. The homogeneity of a blank can also be expressed in other ways, such as in terms of the root-mean-square (RMS) deviation of the phase plot, which provides a measure of the variations in n between different points of the blank. See, for example, Japanese Patent Application Disclosure No. 6-308717, published Nov. 4, 1994.

An application for fused silica blanks which requires very low values of $\Delta n$ (e.g., $\Delta n$ values less than or equal to $1.0 \times 10^{-6}$ and preferably less than or equal to $0.5 \times 10^{-6}$ for blanks having a diameter of 125 mm and larger) is in the production of optical elements for microlithography systems.

Microlithography systems are used to produce integrated circuits and generally include a deep UV laser light source, an illumination lens system, and a projection (imaging) lens system. See, for example, Pfau et al., "Quartz inhomogeneity effects in diffraction-limited deep ultraviolet imaging," *Applied Optics,* Vol. 31, No. 31, pages 6658–6661 (Nov. 1, 1992). The illumination lens system expands the laser beam and homogenizes its intensity. The projection lens system projects a very high resolution image of a mask onto a resist-covered IC wafer.

Diffraction effects limit the line width produced at the IC wafer and thus limit the density of circuits which can be written onto the wafer. In particular, the resolution (R) at the wafer is given by:

$$R = K \cdot \lambda_L / NA, \quad (2)$$

where K is a constant whose value depends on the particular system and process used, $\lambda_L$ is the operating wavelength of the laser light source, and NA is the numerical aperture of the projection lens system.

Reducing the wavelength of the laser light thus improves the resolution and allows narrower lines to be written on the wafer. Accordingly, in recent years, shorter wavelength lasers, e.g., lasers having a wavelength of 400 nm or less, have come into use in microlithography systems. Examples of such lasers include KrF and ArF excimer lasers which operate at 248 nm and 193 nm, respectively.

At these short (UV) wavelengths, standard optical glasses cannot be used for the optical elements of the system because of their high absorption. Fused silica glass, on the other hand, is transparent in the UV range and has thus become the material of choice for this application.

Because the goal of a microlithography system is to produce an image having a resolution in the submicron range, the lens elements used in such a system, and thus the lens blanks used to produce the lens elements, must be of the highest quality. Among other properties, such lens blanks must have high internal transmission values, e.g., above about 99.8% ±0.1% per centimeter, low levels of inclusions, low birefringence, low fluorescence, and high resistance to laser damage at UV wavelengths.

Of critical importance is the blank's Δn value since uncontrolled variations in n manifest themselves as uncorrectable aberrations in the image produced at the IC wafer. Moreover, from equation (2) above, to achieve high resolution, large NA values are needed. Large NA values, in turn, mean large lens elements. Accordingly, not only must Δn be small, it must be small for large blank sizes.

Examples of the efforts which have been made to achieve this combination of a low Δn value and a large blank size include Yamagata et al., U.S. Pat. No. 5,086,352, PCT Publication No. WO 93/00307 published Jan. 7, 1993, Japanese Patent Application Disclosure No. 5-116969 published May 14, 1993, Japanese Patent Application Disclosure No. 6-166527 published Jul. 14, 1994, Japanese Patent Application Disclosure No. 6-234530 published Aug. 23, 1994, and Japanese Patent Application Disclosure No. 6-234531 published Aug. 23, 1994.

In addition to small Δn values for large blank sizes, optical elements used in microlithography systems need to have high off-axis homogeneity, again for large blank sizes. See, for example, Japanese Patent Application Disclosure No. 5-97452, published Apr. 20, 1993, which discusses the need for homogeneity in three directions. This is especially important for prismatic elements used in such systems, where optical planes are formed at angles relative to a blank's z-direction. (See the Pfau et al. article cited above; note that off-axis homogeneity is also important for prisms and other optical elements used in applications other than microlithography systems.)

Off-axis homogeneity can be observed and/or measured in various ways, including through the use of a shadowgram in which diverging light from a point source is passed through a sample and the resulting pattern is observed on an observation screen and through diffraction-based techniques where collimated light is passed through a sample and the far-field diffraction pattern is observed in the Fourier transform plane of a long focal length lens (see "Corning Tests for Striae in Fused Silica," Laser Focus World, page 110, August 1993).

A preferred method for measuring off-axis inhomogeneity is by means of an interferometer/camera system which has a sufficiently fine spatial resolution to detect the inhomogeneities of interest, e.g., a spatial resolution of 18–20 pixels/mm of glass. Such resolution can be achieved by employing a high resolution camera or through the use of a beam reducer located between the interferometer and the sample, this latter approach having the disadvantage that only a small portion of a blank or optical element can be examined at a time. To distinguish off-axis inhomogeneities from noise, processing of the interferometer signal can be performed in accordance with the techniques described in commonly assigned U.S. patent application Ser. No. 60/003,607, entitled "Methods for Detecting Striae", which was filed on Sep. 12, 1995 in the names of David R. Fladd and Stephen J. Rieks.

Using procedures of the foregoing type, off-axis inhomogeneities in the form of periodic (sinusoidal) striae have been observed for blanks made using furnaces of the type shown in FIG. 1. Quantitatively, such striae have been found to have δn values around $10 \times 10^{-8}$, where $$\delta n = (\lambda \cdot PV)/PL, \quad (3)$$

λ is the wavelength of light used by the interferometer, PV is the difference between the highest peak and the lowest valley of the phase plot produced by the interferometer for the striae, and PL is the off-axis path length through the blank.

Figure 3:
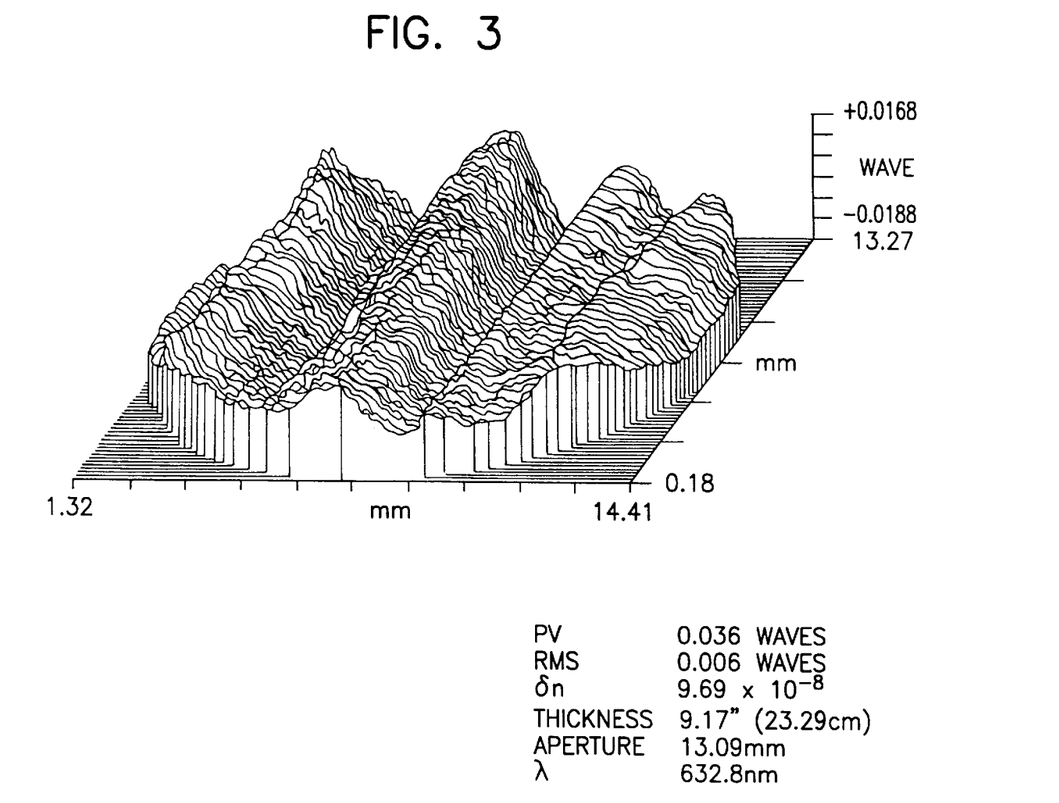
FIG. 3 is an off-axis phase plot for a blank prepared using a prior art furnace of the type shown in FIG. 1. This phase plot was prepared using a beam reducer between the interferometer and the sample and thus has an aperture of only about 13 mm. The data analysis procedures of the above-referenced application entitled "Methods for Detecting Striae" were not used in the preparation of this plot. As shown, the PST and TLT components have been removed from the original raw data.

FIG. 3 is an off-axis phase plot for a blank prepared using a furnace of the type shown in FIG. 1. It should be noted that the vertical scales in FIGS. 2 and 3 are different, as are the horizontal scales; in particular, FIG. 3 has expanded scales in both the vertical and horizontal direction as compared to FIG. 2.

As discussed fully in the above referenced application entitled "Boule Oscillation Patterns for Producing Fused Silica Glass", the oscillation pattern of x-y oscillation table 20 can be used to increase the average peak-to-peak period (spacing) of the off-axis striae ($\Delta z_{striae}$), as well as to reduce their average peak-to-valley magnitude ($\Delta n_{striae}$) at least to some extent. In this way, the ratio of these average values, i.e., the $\Delta n_{striae}/\Delta z_{striae}$ ratio, can be decreased which reduces the optical effects of the striae. The plot of FIG. 3 uses the preferred oscillation pattern of the above-referenced application.

Essentially complete removal of striae, however, has not been achieved in this way. The present invention provides an additional approach for addressing the problem of striae, which approach can be used alone or in combination with the oscillation pattern approach, to reduce off-axis striae for large blank sizes and low Δn values.

SUMMARY OF THE INVENTION

In view of the foregoing, it is an object of this invention to provide improved methods and apparatus for producing silica-containing boules by the flame hydrolysis process. In particular, it is an object of the invention to improve the off axis homogeneity of such boules and thus the off axis homogeneity of blanks and optical elements, including prisms and lens elements, made therefrom. It is a further object of the invention to provide blanks and optical elements which have a high off-axis homogeneity, a high z-axis homogeneity, and a large size.

In accordance with the invention, it has been discovered that the off-axis homogeneity of a boule, and thus the off-axis homogeneity of blanks and optical elements made therefrom, can be significantly improved by controlling the flow of air around the boule during its formation. In particular, it has been found that by substantially eliminating variations in the air flow around a boule resulting from the oscillation of the boule during its formation, off-axis striae can be essentially completely eliminated. Although not wishing to be bound by any particular theory of operation, it is believed that the control of air flow leads to the control of one or more of temperature variation, pressure variation, and/or redox state in the vicinity of the growing boule.

By means of the invention, blanks and optical elements can be produced having $\Delta n_{striae}/\Delta z_{striae}$ values less than or equal to about $1.1\times10^{-8}$ mm$^{-1}$ and z-axis homogeneity values ($\Delta n$ values) less than or equal to $1.0\times10^{-6}$ and preferably less than or equal to $0.5\times10^{-6}$ for blank (element) sizes (e.g., diameters for cylindrical blanks) greater than or equal to 125 mm, preferably greater than or equal to 150 mm, and most preferably greater than or equal to 200 mm. Depending upon the capabilities of the testing equipment used, satisfaction of the $\Delta n_{striae}/\Delta z_{striae}$ and $\Delta n$ criteria can be determined by testing the blank or element as a whole or by testing representative sections thereof. Values for the $\Delta n_{striae}/\Delta z_{striae}$ ratio can be determined manually or automatically by computer using a phase plot or preferably a profile line derived therefrom. See the above-referenced application entitled "Methods for Detecting Striae" and, in particular, the discussion of FIG. 11 of that application.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

Figure 4:
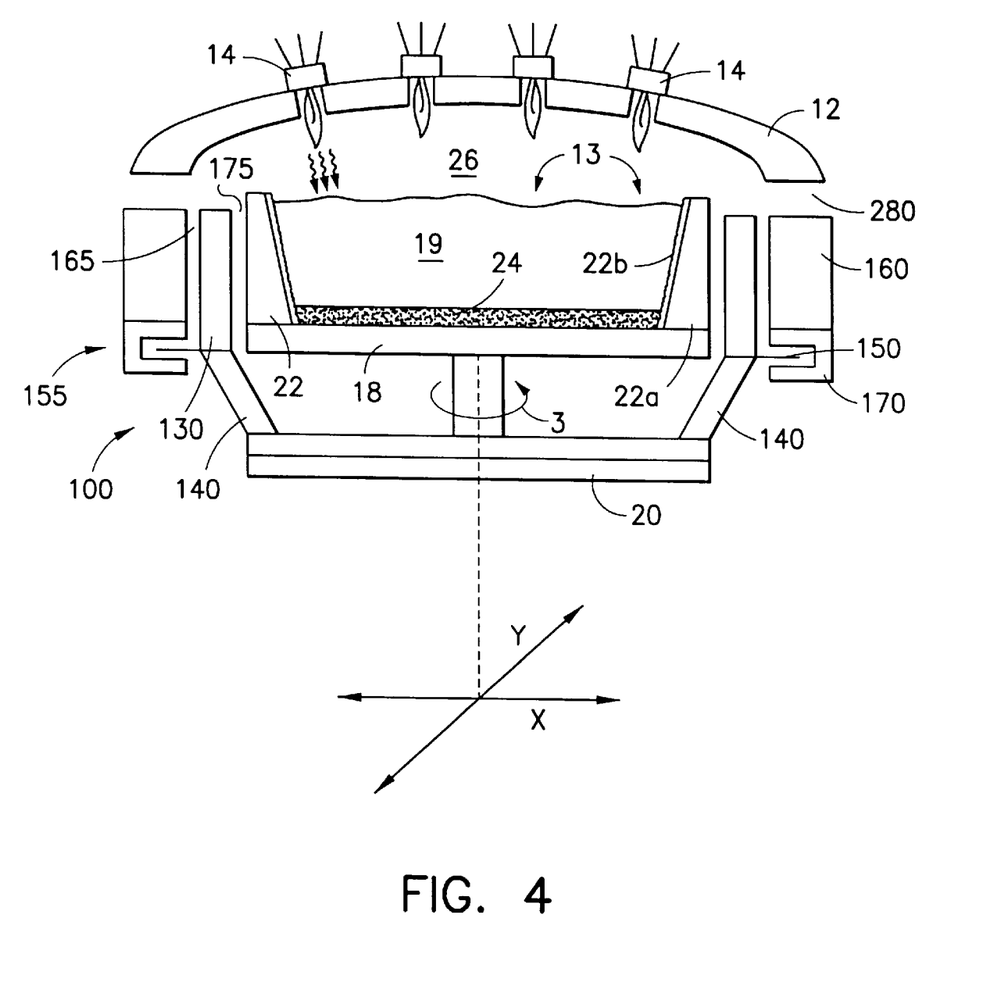
FIG. 4 is a schematic diagram of a furnace constructed in accordance with the present invention.

The drawings of FIGS. 1 and 4 are not intended to indicate scale or relative proportions of the elements shown therein. Like reference characters designate like or corresponding parts in the various figures.

DESCRIPTION OF THE PREFERRED EMBODIMENTS

As discussed above, the present invention relates to methods and apparatus for improving the homogeneity of silica-containing bodies made by vapor deposition techniques. The silica-containing body can be substantially pure fused silica or can contain one or more dopants as desired, e.g., the body can contain a titanium dopant which lowers the coefficient of thermal expansion of the glass. Low levels of contaminates may also be present in the body.

In accordance with the invention, improved off-axis homogeneity is achieved by providing a substantially constant air flow in the furnace in the region of the boule, as opposed to an air flow which oscillates with time. The origin of air flow variations in prior art furnaces can be seen with reference to FIG. 1.

As containment vessel 13 oscillates, the size of the gap 30 locally increases and decreases around the periphery of ring wall 16. These changes cause local variations in the amount of gases extracted from plenum 26. This, in turn, causes changes in (1) the temperature distribution across the top of the boule and (2) the oxidation/reduction state in localized areas within the plenum at the boule surface. Also, radiative losses from the boule vary locally as the gap size changes.

In accordance with the invention, the combination of these effects has been found to produce local variations in the OH content of the boule and thus local variations in the index of refraction. As known in the art, an increase in OH content of 1 ppm by weight leads to a decrease in refractive index of about one part per ten million. See, for example, Hetherington et al., "Water in Vitreous Silica," *Phys. Chem. Glasses,* 1962, 3:129–133, and Yamagata, S., "Effects of OH-Group on Distribution of Refractive Index in Silica Glass," *J. Cer. Soc. Japan,* 1992, 100:337–341. These variations in index of refraction manifest themselves as the undesirable striae which the present invention serves to remove.

FIG. 4 shows a furnace 100 constructed in accordance with the present invention. As in the furnace of FIG. 1, furnace 100 includes a containment vessel 13 which collects soot particles produced by burners 14. Base 18, which forms the bottom of vessel 13, rotates as boule 19 is formed and also oscillates through its attachment to x-y oscillation table 20.

Surrounding containment wall 22 of containment vessel 13 is air flow wall 130. Air flow wall 130 is mounted on x-y oscillation table 20 by means of feet 140, e.g., by four feet equally spaced around the circumference of the air flow wall. Other means of mounting the air flow wall to the oscillation table can be used if desired. In general, the mounting means should include spaces for the ingress of air to the space 175 between the containment wall 22 and the air flow wall 130.

Surrounding air flow wall 130 is stationary wall 160 which supports crown 12. A motion accommodating seal is formed between the stationary wall and the air flow wall. As shown in FIG. 4, this seal comprises an annular plate 150 which rides in (slides in) an annular channel 170 within stationary wall 160. Annular channel 170 can comprise a C-shaped annular metal plate which forms the bottom of the stationary wall. Other forms of motion accommodating seals can be used if desired, including flexible seals composed of flexible metal or refractory cloth which, for example, can be in the form of a bellows.

The furnace construction shown in FIG. 4 minimizes variations in the air flowing around boule 19. Instead of employing a single gap 30 around containment vessel 22, as in FIG. 1, the furnace of FIG. 4 employs two gaps around the containment vessel, one of which, i.e., gap 175, has a constant dimension and carries make-up air to plenum 26, and the other of which, i.e., gap 165, has a variable dimension resulting from the oscillation of x-y table 20, but does not carry substantial amounts of air as a result of the use of motion accommodating seal 155. In this way, the air flow around boule 19 remains substantially constant as the boule is formed thus inhibiting the formation of striae.

As discussed above, in addition to being dependent upon air flows, striae formation is also dependent upon the oscillation pattern used during boule formation. A preferred pattern for x-y oscillation table 20 for use in preparing a boule having a diameter of about five feet (1.5 m) is:

$x(t) = r_1 \sin 2\pi\omega_1 t + r_2 \sin 2\pi\omega_2 t$ $y(t) = r_1 \cos 2\pi\omega_1 t + r_2 \cos 2\pi\omega_2 t$ $r_1 = 0.6$ inches (15.2 mm)

$r_2 = 1.9$ inches (48.3 mm)

Figure 5:
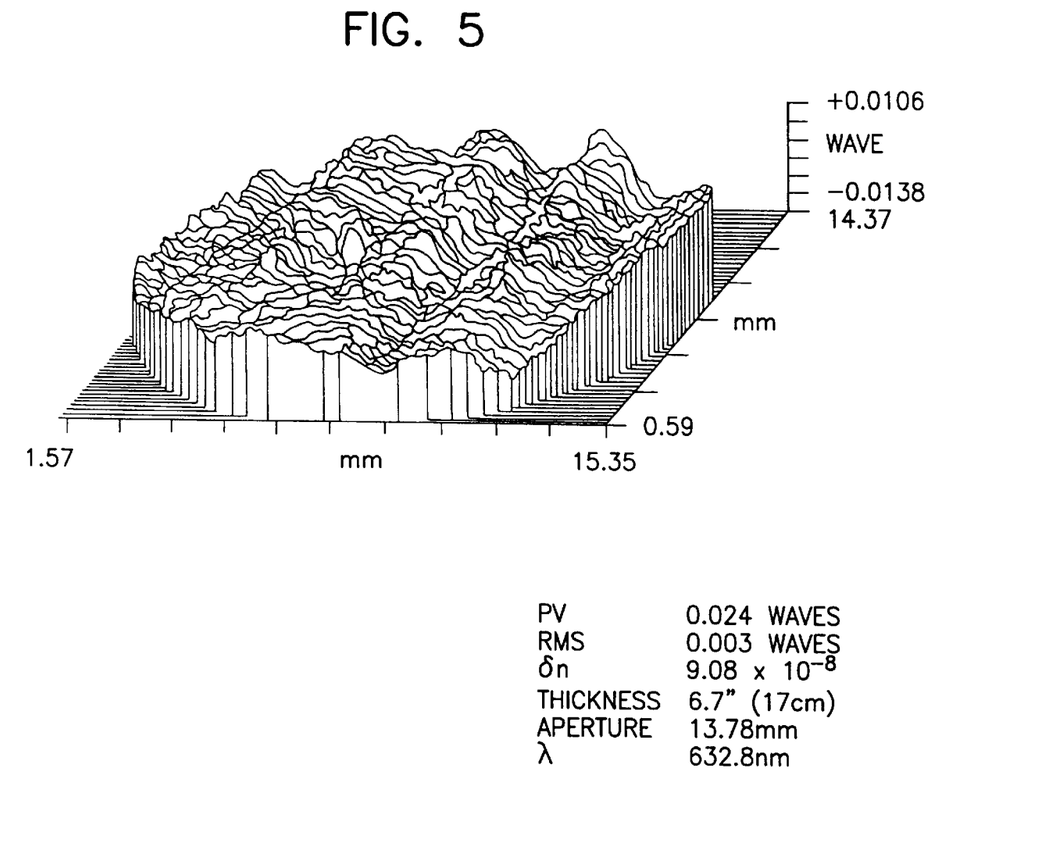
FIG. 5 is an off-axis phase plot for a blank prepared using a furnace of the type shown in FIG. 4. As with FIG. 3, this plot was prepared using a beam reducer between the interferometer and the sample so that the aperture is only about 13 mm. To enhance the appearance of the weak off-axis striae of this plot, high pass filtering was performed using a Zernike polynomial fit as described in the above-referenced application entitled "Method for Detecting Striae". As shown, the PST, TLT, PWR, and AST components have been removed from the original raw data. It should be noted that FIG. 5 is a worse case plot in that all other phase plots taken from the same blank exhibited a lower level of off-axis striae than that shown in this figure.

$\omega_1 = 0.10$ rpm $\omega_2 = 0.41$ rpm where x(t) and y(t) represent the coordinates of the center of the boule as a function of time (t) and time is measured in minutes. This x-y oscillation pattern is preferably used in combination with an overall boule rotation rate ($\omega_3$) of 6.9 rpm. This overall rotation of the boule is illustrated by reference number 3 in FIGS. 1 and 4. The phase plots of FIGS. 2, 3, and 5 are for boules made using this preferred oscillation pattern and preferred overall rotation rate. These parameter values are referred to as "process 3" in the above-referenced patent application entitled "Boule Oscillation Patterns for Producing Fused Silica Glass." A full discussion of the effects of oscillation patterns on striae formation can be found in that application.

By means of the invention, significant improvements in homogeneity and, in particular, off-axis homogeneity have been achieved. For example, using a furnace having the structure of FIG. 4 and the above preferred boule rotation rate and oscillation pattern, boules having a diameter of up to 1.53 meters can be manufactured and used to produce blanks having diameters up to 275 millimeters, $\Delta n$ values of less than $0.5 \times 10^{-6}$, and $\Delta n_{striae}/\Delta z_{striae}$ values less than $1.1 \times 10^{-8}$ mm$^{-1}$. Such blanks can be used to produce optical elements for microlithography systems employing, for example, KrF lasers.

Quantitatively, FIG. 5 shows an off-axis phase plot for such a blank. Comparison of this plot with that of FIG. 3, which was formed using the same oscillation pattern and boule rotation rate but with a furnace of the type shown in FIG. 1, clearly demonstrates the significant improvements in homogeneity achieved by means of the invention. The $\Delta n_{striae}/\Delta z_{striae}$ values for FIGS. 3 and 5 are $1.37 \times 10^{-8}$ mm$^{-1}$ and $1.08 \times 10^{-8}$ mm$^{-1}$, respectively.

Figure 6A:
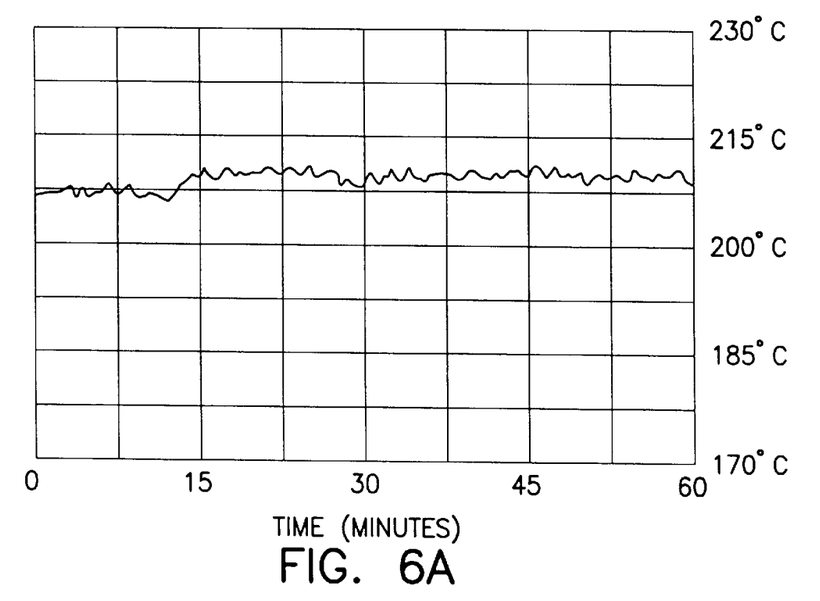
FIGS. 6A and 6B compare variations in exhaust port temperature as a function of time for a FIG. 4 furnace (FIG. 6A) and a FIG. 1 furnace (FIG. 6B).
Figure 6B:
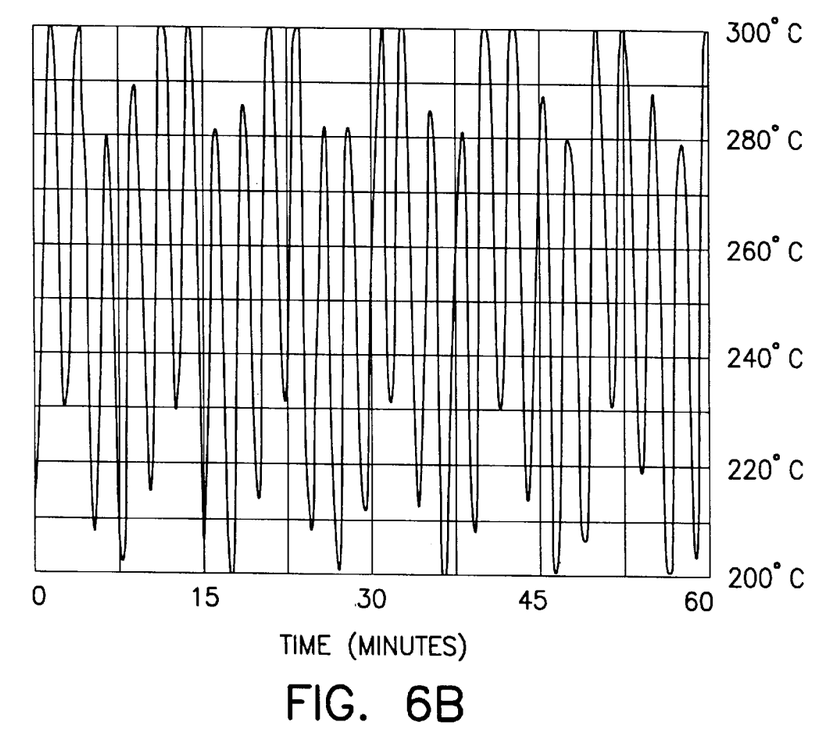
Figure 7A:
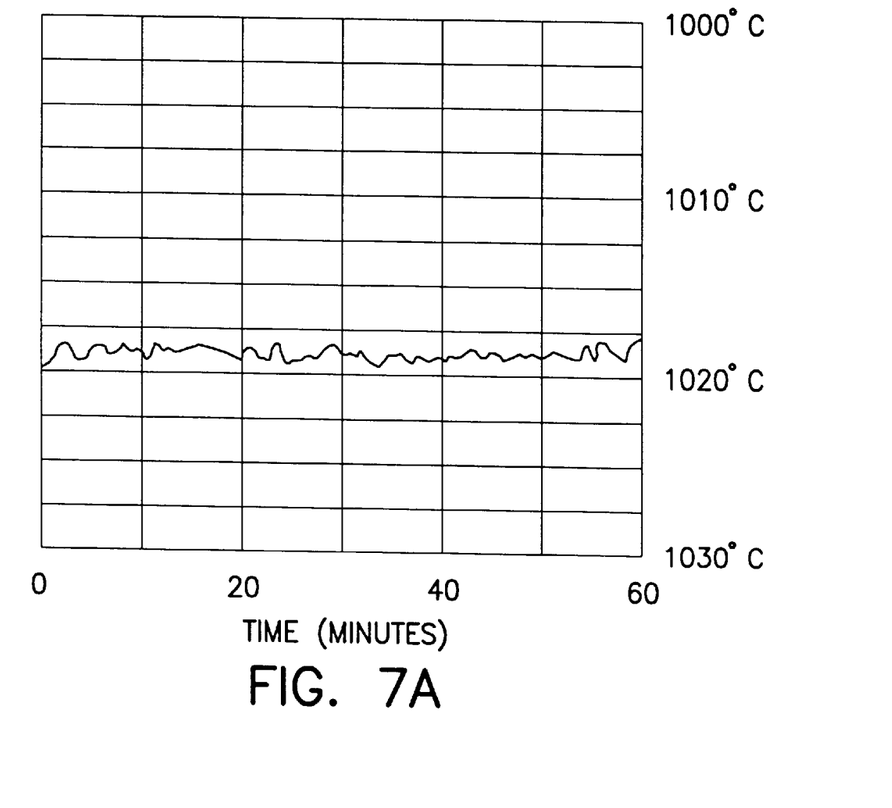
FIGS. 7A and 7B compare variations in crown temperature as a function of time for a FIG. 4 furnace (FIG. 7A) and a FIG. 1 furnace (FIG. 7B).
Figure 7B:
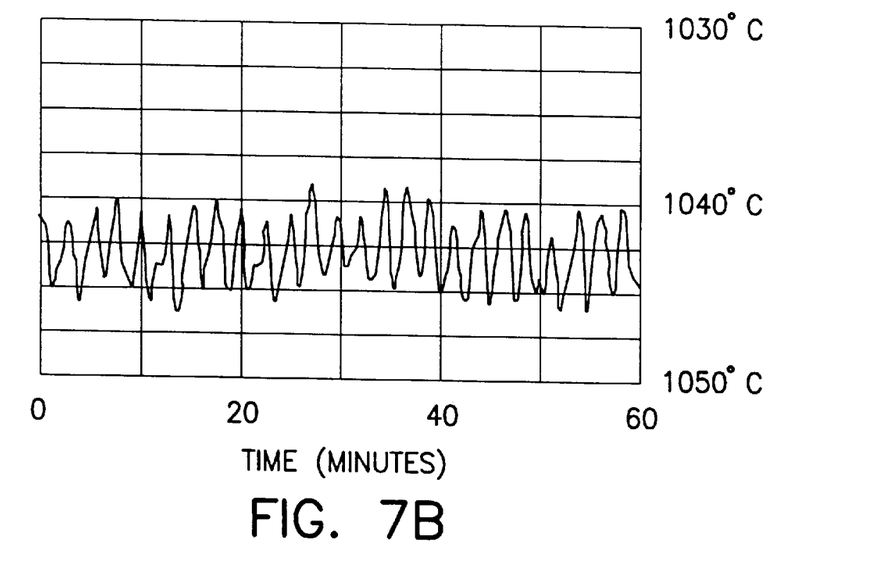

FIGS. 6 and 7 illustrate the uniformity of the internal furnace environment achieved by the air flow control system of the invention.

FIG. 6 compares variations in exhaust port temperature (i.e., the temperature in the vicinity of port 28 in FIG. 1 and port 280 in FIG. 4) as a function of time. FIG. 6A shows the results measured for a FIG. 4 furnace, while FIG. 6B shows the results for a prior art furnace of the type shown in FIG. 1. Both furnaces were operated using the preferred oscillation pattern and boule rotation rate discussed above. As can be seen in this figure, the constancy of the air flow through gap 175, produces a marked reduction in the variation of exhaust port temperature with time.

FIGS. 7A and 7B compare variations in crown temperature as a function of time for a FIG. 4 furnace (FIG. 7A) and a FIG. 1 furnace (FIG. 7B). Crown temperature was measured at a position about 12 inches (30.5 cm) from the center of the crown. The oscillation and rotation parameters used for this experiment were:

$r_1 = 1.2$ inches (30.5 mm)

$r_2 = 2.3$ inches (58.4 mm)

$\omega_1 = 5.34$ rpm $\omega_2 = 5.876$ rpm $\omega_3 = 4.98$ rpm

These values tend to create even greater internal variations within the furnace than the preferred values discussed above and thus are considered a more extreme test of the capabilities of the invention. As shown in FIG. 7, the furnace of the invention produced substantially less variation in crown temperature than that produced by the prior art furnace. This data also show that the invention provides greater freedom in the choosing of oscillation and rotation patterns since even with less than optimum patterns, a uniform internal environment within the furnace is achieved.

In addition to the foregoing advantages, it has also been found that the invention increases deposition efficiency by about 7% on average. This increase is the result of the more uniform conditions within the furnace, and, in particular, to reduced turbulence in the plenum.

Reduced turbulence in the plenum has additional advantages. For example, it allows bait sand 24 to be composed of smaller particles. Smaller particles means that purer sand can be used since purer sand is typically composed of smaller particles. Purer sand, in turn, means that the boule will run hotter which reduces the occurrence of gaseous inclusions (bubbles) and improves flow, both of which make for more homogeneous blanks. Reduced turbulence also results in less degradation of the burner apertures in the crown since there is less impingement of burner flame on the edges of those apertures.

Although preferred and other embodiments of the invention have been described herein, additional embodiments may be perceived by those skilled in the art without departing from the scope of the invention as defined by the following claims.

What is claimed is:

1. A method for forming a silica-containing body comprising:
   (a) providing soot particles;
   (b) collecting the soot particles to form the body;
   (c) oscillating the body as the soot particles are collected; and
   (d) flowing air past the body as the soot particles are collected, said air flow being substantially constant so as to reduce the formation of off-axis striae in the silica-containing body as the body is oscillated,
   wherein:
   the soot particles are collected in a containment vessel attached to an oscillation table, said containment vessel comprising a containment wall;
   the containment wall is surrounded by an air flow wall attached to said oscillation table and spaced therefrom to form air passages, said air flow wall (i) being spaced from the containment wall, and (ii) oscillating with the body: and
   the flowing air passes through said air passages and between the containment wall and the air flow wall.

2. The method of claim 1 wherein the constancy of the air flow is sufficient so that a blank formed from the body has substantially no striae.

3. A method for forming a silica-containing body comprising:
   (a) providing soot particles;
   (b) collecting the soot particles to form the body:
   (c) oscillating the body as the soot particles are collected; and
   (d) flowing air past the body as the soot particles are collected, said air flow being substantially constant as the body is oscillated;
   wherein the constancy of the air flow is sufficient so that a blank formed from the body has a $\Delta n_{striae}/\Delta z_{striae}$ value which is less than or equal to about $1.1 \times 10^{-8}$ mm$^{-1}$, where $\Delta n_{striae}$ and $\Delta z_{striae}$ are the average peak-to-valley magnitude and the average peak-to-peak period, respectively, of the blank's off-axis striae.

4. The method of claim 3 wherein the blank has a z-axis homogeneity $\Delta n$ which is less than or equal to $1.0 \times 10^{-6}$ for a blank size greater than or equal to 125 millimeters.

5. The method of claim 3 wherein the blank has a z-axis homogeneity $\Delta n$ which is less than or equal to $0.5 \times 10^{-6}$ for a blank size greater than or equal to 125 millimeters.

6. The method of claim 4 or 5 wherein the blank size is greater than or equal to 150 millimeters.

7. The method of claim 4 or 5 wherein the blank size is greater than or equal to 200 millimeters.

8. A furnace for use in forming a silica-containing body, said furnace comprising:
   (a) means for providing soot particles;
   (b) means for collecting the soot particles to form the body said means comprising a containment vessel which comprises a containment wall;
   (c) means for oscillating the body as the soot particles are collected, said means for oscillating being attached to said means for collecting soot particles; and
   (d) means for providing a substantially constant air flow past the body as the soot particles are collected and the body is oscillated, said means comprising:
   an air flow wall attached to said means for oscillating the body and spaced therefrom to form air passages, said air flow wall (i) surrounding the containment wall, (ii) being spaced from the containment wall, and (iii) oscillating with the body; and
   said air passages providing air to means for flowing air between the containment wall and the air flow wall.

9. The furnace of claim 8 wherein the means for providing a substantially constant air flow further comprises:
   a stationary outer wall which (i) surrounds the air flow wall and (ii) is spaced from the air flow wall; and
   a motion accommodating seal between the outer wall and the air flow wall which substantially blocks flow of air between the outer wall and the air flow wall.

* * * * *